United States Patent
Lee et al.

(10) Patent No.: US 8,446,532 B2
(45) Date of Patent: May 21, 2013

(54) IMAGE PROCESSING APPARATUS FOR IMPROVING SHARPNESS AND IMAGE PROCESSING METHOD

(75) Inventors: Ki-deok Lee, Seoul (KR); Bo-gun Park, Suwon-si (KR); Youn-sook Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 337 days.

(21) Appl. No.: 12/732,866

(22) Filed: Mar. 26, 2010

(65) Prior Publication Data

US 2011/0051008 A1 Mar. 3, 2011

(30) Foreign Application Priority Data

Aug. 25, 2009 (KR) ........................ 10-2009-0078710

(51) Int. Cl.
*H04N 5/21* (2006.01)
(52) U.S. Cl.
USPC ........................................................ 348/678
(58) Field of Classification Search
USPC .......... 348/678, 687, 679, 673; 382/167–169, 382/284, 254, 266; 345/690
See application file for complete search history.

(56) References Cited

U.S. PATENT DOCUMENTS

| | | | | |
|---|---|---|---|---|
| 4,090,217 A * | 5/1978 | Goyal et al. | | 348/627 |
| 5,540,097 A * | 7/1996 | Hisata | | 73/620 |
| 5,561,474 A * | 10/1996 | Kojima et al. | | 348/653 |
| 7,009,627 B2 * | 3/2006 | Abe et al. | | 345/690 |
| 7,502,077 B2 * | 3/2009 | Miura et al. | | 348/691 |
| 7,538,822 B2 * | 5/2009 | Lee et al. | | 348/606 |
| 7,602,538 B2 * | 10/2009 | Kagaya | | 358/521 |
| 7,702,175 B2 * | 4/2010 | Yazaki et al. | | 382/266 |
| 7,800,697 B2 * | 9/2010 | Ishigami et al. | | 348/655 |
| 7,860,339 B2 * | 12/2010 | Yamashita et al. | | 382/274 |
| 7,929,025 B2 * | 4/2011 | Liu | | 348/223.1 |
| 8,047,992 B2 * | 11/2011 | Hashimoto et al. | | 600/443 |
| 8,049,810 B2 * | 11/2011 | Sugimoto | | 348/345 |
| 8,050,515 B2 * | 11/2011 | Chen | | 382/274 |
| 8,131,084 B2 * | 3/2012 | Kim et al. | | 382/199 |
| 8,253,862 B2 * | 8/2012 | Chen et al. | | 348/625 |
| 2002/0067862 A1 | 6/2002 | Kim | | |
| 2003/0122759 A1 * | 7/2003 | Abe et al. | | 345/89 |
| 2006/0038836 A1 * | 2/2006 | Abe et al. | | 345/690 |

FOREIGN PATENT DOCUMENTS

| | | |
|---|---|---|
| EP | 1494462 A1 | 1/2005 |
| EP | 1517544 A1 | 3/2005 |
| EP | 1708488 A2 | 10/2006 |
| KR | 10-0528887 B1 | 11/2005 |

OTHER PUBLICATIONS

De Vries, F.P.Ph, "Automatic, Adaptive, Brightness Independent Contrast Enhancement", Signal Processing, Elsevier Science Publishers, vol. 21, No. 2, Oct. 1, 1990, pp. 169-182.

(Continued)

*Primary Examiner* — Paulos M Natnael
(74) *Attorney, Agent, or Firm* — Sughrue Mion, PLLC (57) ABSTRACT

An image processing apparatus includes an image receiving unit, and an image processing unit which allows luminance of an image to be within a preset range of luminance and adjusts sharpness of the image. Accordingly, the problem that the luminance exceeds a digital value may be prevented, and the sharpness of the image may be effectively improved.

11 Claims, 7 Drawing Sheets

OTHER PUBLICATIONS

Cheikh, Faouzi Alaya et al., "Directional-Rational Approach for Color Image Enhancement", Circuits and Systems, 2000. Proceedings of International Symposium on Circuits and Systems, May 28-31, 2000. vol. 3, pp. 563-566.

Extended European Search Report issued Jul. 6, 2010, in counterpart European Application No. 10157631.2.

Pratt W K ED—Pratt W K, "digital image processing, 10—image enhancement, 17—image segmentation", Jan. 1, 2001, Digital Image Processing PIKS Inside, New York. John Wiley & Sons, US, pp. 243-258, 551, XP002382858, ISBN. 978-0-471-37407-7.

Communication dated Jan. 17, 2012 from the European Patent Office in counterpart European application No. 10157631.2.

* cited by examiner

IMAGE PROCESSING APPARATUS FOR IMPROVING SHARPNESS AND IMAGE PROCESSING METHOD

CROSS-REFERENCE TO RELATED APPLICATIONS

This application claims priority from Korean Patent Application No. 10-2009-0078710, filed on Aug. 25, 2009 in the Korean Intellectual Property Office, the disclosure of which is incorporated herein by reference in its entirety.

BACKGROUND

1. Field of the Invention

Apparatuses and methods consistent with the present disclosure relate to an image processing apparatus and an image processing method, and more particularly, to an image processing apparatus for improving clarity and an image processing method.

2. Description of the Related Art

As display technology has been developing, when the clarity of image contents is lower than the resolution supported by display apparatuses, technologies for improving image quality using digital technology have been used. Accordingly, the clarity of an image may be enhanced by emphasizing edge components in fine portions of the image, and the overall image quality may be improved.

To improve the clarity of fine portions of an image, a gain of the luminance value of the image should be increased. However, if a gain of the luminance value of the image is excessively increased, the luminance may exceed a range in which a digital value can be expressed. In addition, if the gain of the luminance value is increased and the luminance exceeds the range in which a digital value can be expressed, borders of the image may be dark. As a result, the details of the image may be degraded and artifacts may occur, thereby deteriorating recognition of the image.

Therefore, there is a need for methods for preventing the problem of exceeding the digital value, and improving the clarity of image.

SUMMARY

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

The present disclosure provides an image processing apparatus and an image processing method capable of reducing artifacts and improving the clarity of image.

Specifically, the present disclosure provides an image processing apparatus which processes an image to be displayed on a display, the image processing apparatus including an image receiving unit, and an image processing unit which allows luminance of an image input to the image receiving unit to be within a preset range of luminance measured according to an original luminance of the image using a threshold value of luminance which can be expressed by the display and the original luminance of the image, and which adjusts clarity of the image.

The image processing unit may include a gain determination unit which determines a gain to adjust clarity of the image based on the original luminance of the image, and a gain adjustment unit which adjusts the gain determined by the gain determination unit based on the threshold value, and adds the adjusted gain to the original luminance of the image so that clarity of the image may be improved.

The gain adjustment unit may adjust the gain so that the luminance of the image to which the adjusted gain is added may be within the preset range of luminance measured according to the original luminance of the image based on the threshold value.

The gain adjustment unit may adjust the gain based on change of the luminance according to change of a time at which the image is input or based on change of the luminance according to change of a pixel to which the image is input.

The gain adjustment unit may adjust the gain for the luminance of each pixel or for the luminance of each time so that an amount of change of the luminance according to change of the time at which the image is input or an amount of change of the luminance according to change of the pixel to which the image is input may be increased.

The image processing unit may include a luminance detection unit which detects the original luminance of the image, and a threshold determination unit which determines the threshold value.

The threshold value may include a maximum threshold value and a minimum threshold value of the luminance.

The present disclosure further provides an image processing apparatus which processes an image to be displayed on a display, the image processing apparatus including a gain determination unit which detects change of luminance according to change of a pixel or change of a time from the image, and determines a gain to adjust the luminance based on the result of the detection, and a gain adjustment unit which adjusts the gain so that the luminance to which the adjusted gain is added may be within a range of luminance which can be expressed by the display.

The present disclosure further provides a method for processing an image to be displayed on a display, the method including receiving an image, and allowing luminance of the image to which a gain is added to be within a preset range of luminance measured according to an original luminance of the image using a threshold value of luminance which can be expressed by the display and the original luminance of the image, and adjusting clarity of the image.

The adjusting of clarity of the image may include determining the gain to adjust clarity of the image based on the original luminance of the image, and adjusting the determined gain based on the threshold value, and adding the adjusted gain to the original luminance of the image, and adjusting clarity of the image by adding the adjusted gain to the original luminance of the image.

In the adjusting of clarity of the image, the determined gain may be adjusted so that the luminance of the image to which the adjusted gain is added may be within the preset range of luminance measured according to the original luminance of the image.

In the determining of the gain, the gain may be determined based on change of the luminance according to change of a time at which the image is input or based on change of the luminance according to change of a pixel to which the image is input.

In the determining of the gain, the gain for the luminance of each pixel or for the luminance of each time may be determined so that an amount of change of the luminance according to change of the time at which the image is input or an amount of change of the luminance according to change of the pixel to which the image is input may be increased.

The present disclosure also provides a method for processing an image to be displayed on a display, the method including detecting change of luminance according to change of a pixel or change of a time from the image, determining a gain to adjust the luminance based on the result of the detection, and adjusting the gain so that the luminance to which the adjusted gain is added may be within a range of luminance which can be expressed by the display.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS OF THE INVENTION

Certain exemplary embodiments of the present invention will now be described in greater detail with reference to the accompanying drawings.

In the following description, like drawing reference numerals are used for like elements, even in different drawings. The matters defined in the description, such as detailed construction and elements, are provided to assist in a comprehensive understanding of the invention. However, the present invention can be practiced without those specifically defined matters. Also, well-known functions or constructions are not described in detail since they would obscure the invention with unnecessary detail.

Figure 1:
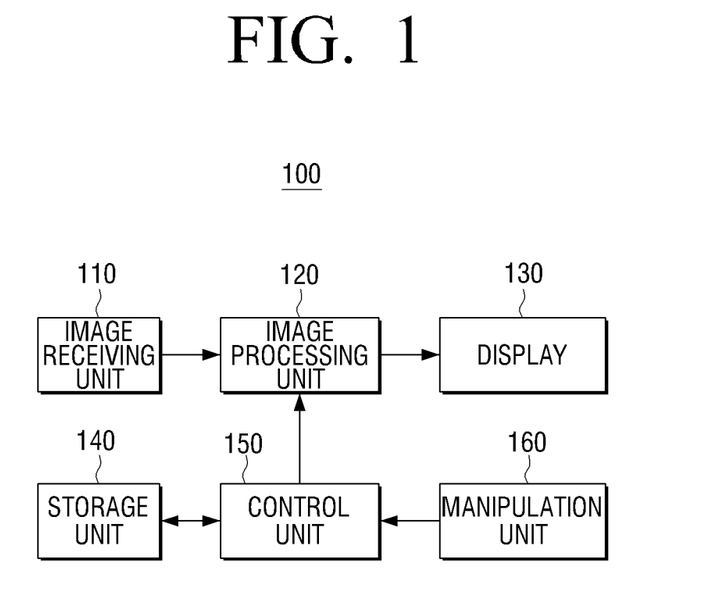
FIG. 1 is a schematic block diagram of an image processing apparatus according to an exemplary embodiment of the present invention.

FIG. 1 is a schematic block diagram of an image processing apparatus 100 according to an exemplary embodiment of the present invention. The image processing apparatus 100 corrects clarity of an image by adjusting luminance of the image so that the luminance of the image may be within a luminance range measured according to the original luminance of the image.

As illustrated in FIG. 1, an exemplary embodiment of the image processing apparatus 100 may include an image receiving unit 110, an image processing unit 120, a display 130, a storage unit 140, a control unit 150, and a manipulation unit 160.

The image receiving unit 110 may receive image data of diverse formats. For example, the image receiving unit 110 may receive image data from a storage medium which stores images compressed in a Motion Picture Experts Group 2 (MPEG-2) format, or may receive image data through a digital broadcast signal compressed in MPEG-2. The image receiving unit 110 transmits received image data to the image processing unit 120.

The image processing unit 120 performs signal-processing of the image data, such as decompression, improvement of clarity and the like. In particular, the image processing unit 120 decodes the image data compressed in MPEG-2, so the decompressed image data are output. In addition, the image processing unit 120 improves clarity of the image by adjusting luminance of the image using a threshold value of the luminance which can be expressed by the display 130, and the luminance of the input image so that the luminance of the input image may be within a preset luminance range measured according to the original luminance of the image. A detailed structure of the image processing unit 120 is discussed below with reference to FIG. 2.

The image processing unit 120 transmits the decompressed and clarified image to the display 130, and the display unit 130 displays the image.

The control unit 150 controls the overall operation of the image processing apparatus 100. More specifically, the control unit 150 controls the image processing unit 120 to decompress an image received from the image receiving unit 110 and improve clarity of the image.

In addition, to improve clarity of the image, the control unit 150 controls the storage unit 140 to store a threshold value of luminance which can be expressed by the display 130, and information regarding a luminance range measured according to the original luminance of the image.

The storage unit 140 stores information needed to improve clarity of an image received by the image receiving unit 110, and programs needed to operate the image processing apparatus 100. The information needed to improve clarity of an image may include a threshold value of luminance which can be expressed by the display 130, and a luminance range measured according to the original luminance of the image. The storage unit 140 may be implemented with a hard disk, a non-volatile memory, or the like.

The manipulation unit 160 transmits a user command, which is input through a remote control (not shown) or manipulation buttons provided on the image processing apparatus 100, to the control unit 150.

Detailed configuration of the image processing unit 120 for improving clarity is described below with reference to FIG. 2.

Figure 2:
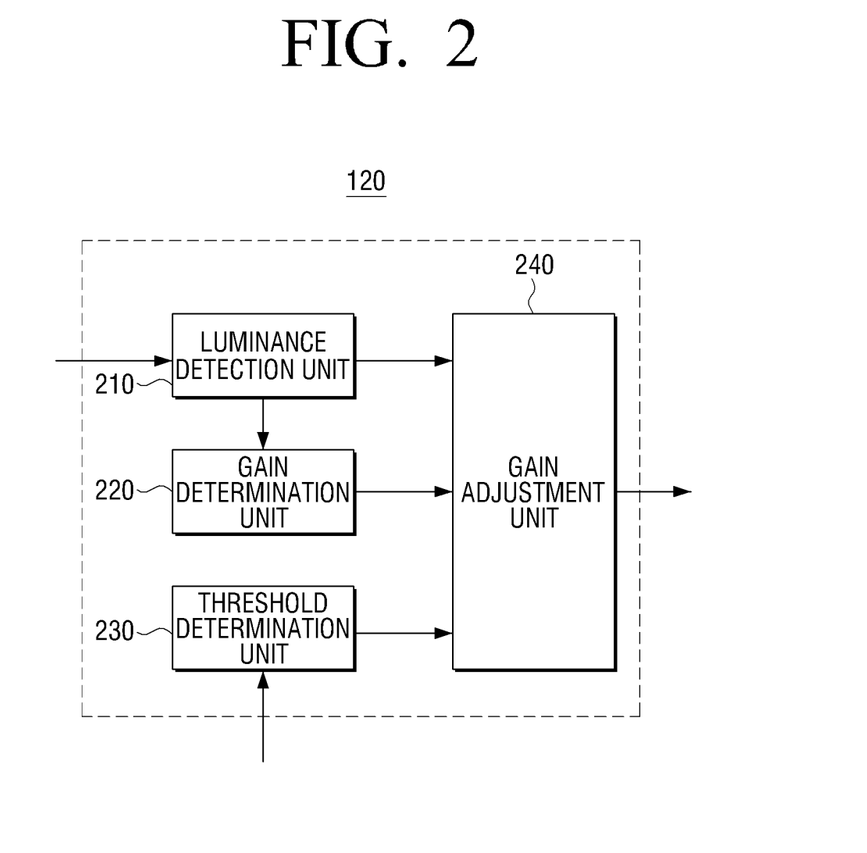
FIG. 2 is a detailed block diagram of an image processing unit.

FIG. 2 is a detailed block diagram of the image processing unit 120. The image processing unit 120 may include a luminance detection unit 210, a gain determination unit 220, a threshold determination unit 230, and a gain adjustment unit 240.

The luminance detection unit 210 detects luminance of an image input to the image receiving unit 110. The luminance detection unit 210 may detect luminance per pixel, or detect luminance per pixel group consisting of a plurality of pixels. Detailed description thereof is given with reference to FIGS. 3A to 3B.

Figure 3A:
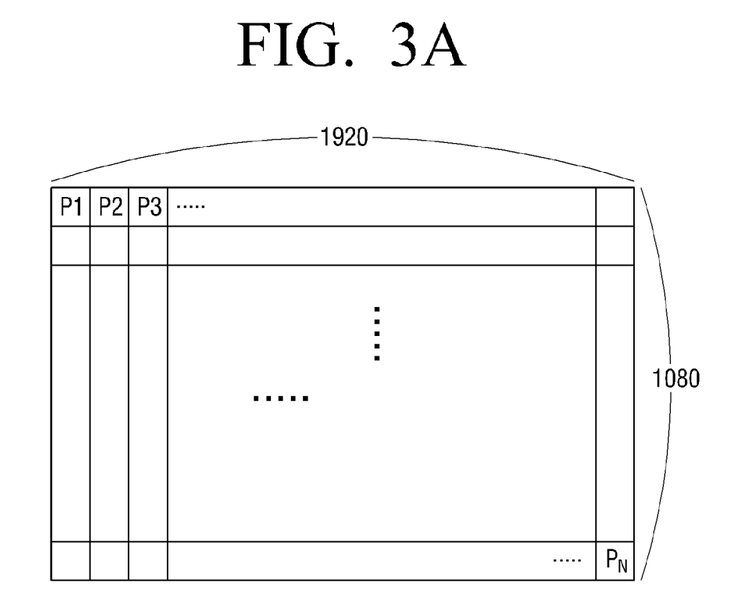
FIGS. 3A and 3B illustrate a method for detecting luminance using a luminance detection unit.
Figure 3B:
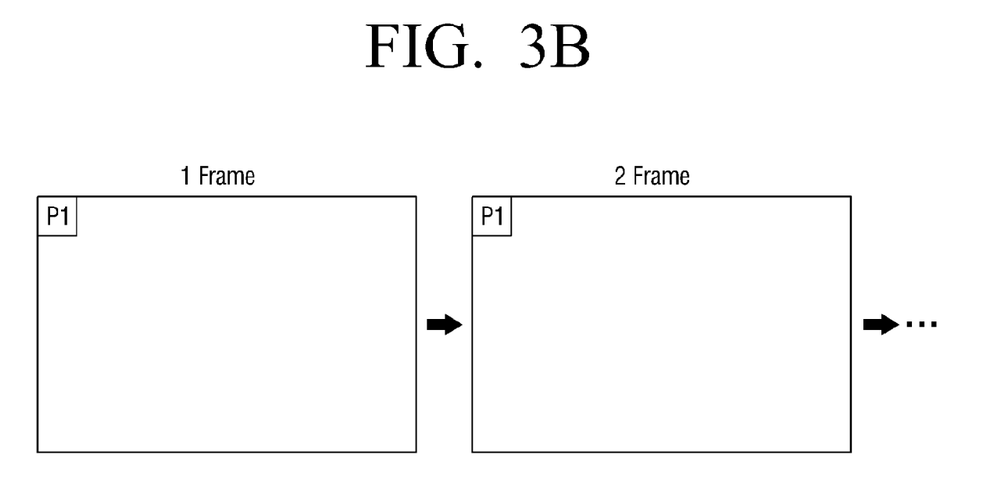

FIGS. 3A and 3B illustrate exemplary embodiments of methods for detecting luminance using the luminance detection unit 210. More specifically, FIG. 3A illustrates an exemplary embodiment of a method for detecting luminance according to change of a pixel, and FIG. 3B illustrates an exemplary embodiment of a method for detecting luminance according to change of a frame (time).

As illustrated in FIG. 3A, if there are 1920*1080 pixels per frame, the luminance detection unit 210 detects luminance of the first pixel $P_1$ to the last pixel $P_N$, and an amount of change of luminance according to change of pixel from $P_1$ to $P_N$. In this exemplary embodiment, in a single frame, luminance of each pixel and an amount of change of luminance according to change of a pixel are detected. Also, it may be possible for the luminance detection unit 210 to detect luminance of each pixel and an amount of change of luminance according to change of a pixel in every frame or per a designated frame.

As illustrated in FIG. 3B, the luminance detection unit 210 detects luminance of the same pixel (the first pixel $P_1$ in this exemplary embodiment) in every frame, and an amount of change of luminance of $P_1$ according to change of a frame. In this exemplary embodiment, an amount of change of luminance of $P_1$ is detected. Also, it may be possible for the luminance detection unit 210 to detect luminance of each pixel and an amount of change of luminance according to change of a frame in every pixel or designated pixels.

The luminance detection unit 210 transmits the detected luminance and amount of change of the luminance to the gain determination unit 220 and the gain adjustment unit 240. Detailed description of the transmitted luminance and amount of change of luminance is given below with reference to FIG. 4.

Figure 4:
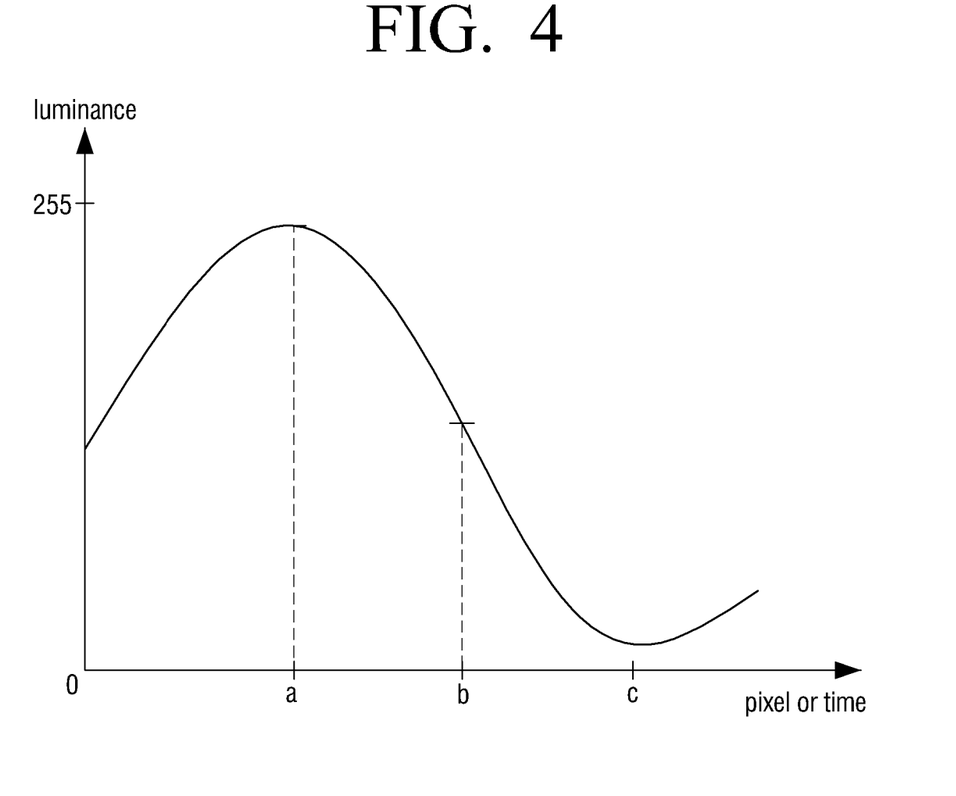
FIG. 4 is a graph illustrating luminance and an amount of change of luminance.

FIG. 4 is a graph illustrating luminance and an amount of change of luminance. In FIG. 4, for convenience of description, an amount of change of luminance according to change of the pixels from $P_1$ to $P_N$ in a single frame and an amount of change of luminance of the same pixel according to change of frames are shown together.

If the x-axis indicates pixel, the graph indicates an amount of change of luminance according to change of the pixels from $P_1$ to $P_N$ in a single frame, and if the x-axis indicates time, the graph indicates an amount of change of luminance of the same pixel according to change of frames.

The y-axis indicates luminance, ranging between 0 to 255 which is a threshold value of luminance which can be expressed by the display 130.

Referring to FIG. 2, the gain determination unit 220 determines a gain to adjust luminance of each pixel and luminance of each frame which are input from the luminance detection unit 210. In particular, when determining a gain to adjust luminance of an input image, the gain determination unit 220 determines a gain based on change of luminance according to change of time at which the image is input or based on change of luminance according to change of pixel to which the image is input. More specifically, the gain determination unit 220 determines a gain per luminance of each pixel or per luminance at each time so that an amount of change of luminance according to change of time at which the image is input, or an amount of change of luminance according to change of pixel to which the image is input are increased. Detailed description thereof is given below with reference to FIG. 5.

Figure 5:
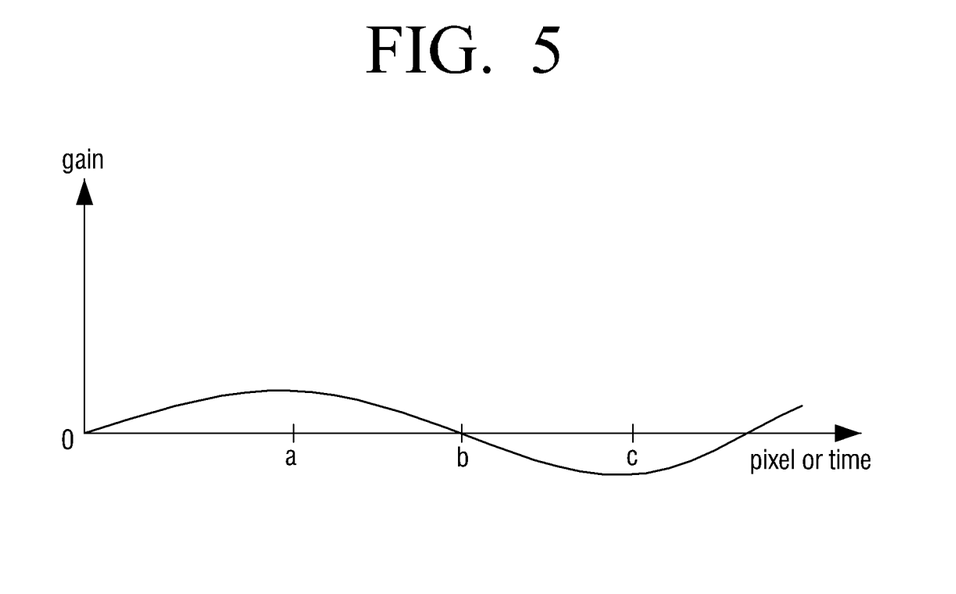
FIG. 5 is a graph illustrating a gain which is determined according to luminance of an input image.

FIG. 5 is a graph illustrating a gain which is determined according to luminance of an input image. Hereinafter, description is given together with FIG. 4.

FIG. 4 is a graph illustrating luminance and an amount of change of luminance. If change of luminance according to change of a pixel in a single frame or change of luminance of the same pixel according to change of a frame is shown in FIG. 4, the gain determination unit 220 determines a gain to emphasize the waveform of FIG. 4 showing an amount of change of luminance.

To do this, the gain determination unit 220 may extract a maximum point (a), an inflection point (b), and a minimum point (c) from the graph of FIG. 4, may add the highest gain to a pixel having luminance of the maximum point (a), may not add a gain to a pixel having luminance of the inflection point (b), and may the lowest gain to a pixel having luminance of the minimum point (c). The highest gain is a gain having the highest positive value, and the lowest gain is a gain having the highest negative value.

In addition, as luminance reaches from the inflection point (b) to the maximum point (a), the gain determination unit 220 gradually increases a gain, and as luminance reaches from the inflection point (b) to the minimum point (c), the gain determination unit 220 gradually decreases a gain. Therefore, as luminance reaches from the inflection point (b) to the maximum point (a), the plus value of the gain is gradually greater, and as luminance reaches from the inflection point (b) to the minimum point (c), the minus value of the gain is gradually greater (that is, an absolute value of the gain is gradually greater).

FIG. 5 illustrates a gain determined by the gain determination unit 220 based on the waveform of FIG. 4 showing an amount of change of luminance. As discussed above, a gain at the maximum point (a) is the highest, a gain at the inflection point (b) is 0, and a gain at the minimum point (c) is the lowest.

Referring to FIG. 2, the gain determination unit 220 transmits the gain determined according to each pixel or according to each frame to the gain adjustment unit 240.

The threshold determination unit 230 detects a digital threshold value of luminance which can be expressed by the display 130. In particular, the threshold determination unit 230 detects the maximum and minimum threshold value of luminance which can be expressed by the display 130.

In this exemplary embodiment, it is assumed that the maximum and minimum threshold value of luminance which can be expressed by the display 130 are 255 and 0. Accordingly, the threshold determination unit 230 extracts the threshold values 0 and 255 of luminance which can be expressed by the display 130, and transmits the extracted values to the gain adjustment unit 240.

The gain adjustment unit 240 adjusts the gain determined by the gain determination unit 220 using the luminance and the amount of change of the luminance, which are received from the luminance detection unit 210, the gain, which is received from the gain determination unit 220, according to each pixel or according to each frame, and the threshold values of luminance which can be expressed by the display 130, which are received from the threshold determination unit 230. In addition, the gain adjustment unit 240 adds the adjusted gain to the luminance of the image, so clarity of the image may be improved.

However, if clarity of the image is adjusted by adding the gain determined by the gain determination unit 220 to the luminance received from the luminance detection unit 210, the luminance may exceed a range in which a digital value can express, so borders of the image may be dark. As a result, the details of the image may be degraded and artifacts may occur, thereby deteriorating recognition of the image. This matter is illustrated in FIG. 6.

Figure 6:
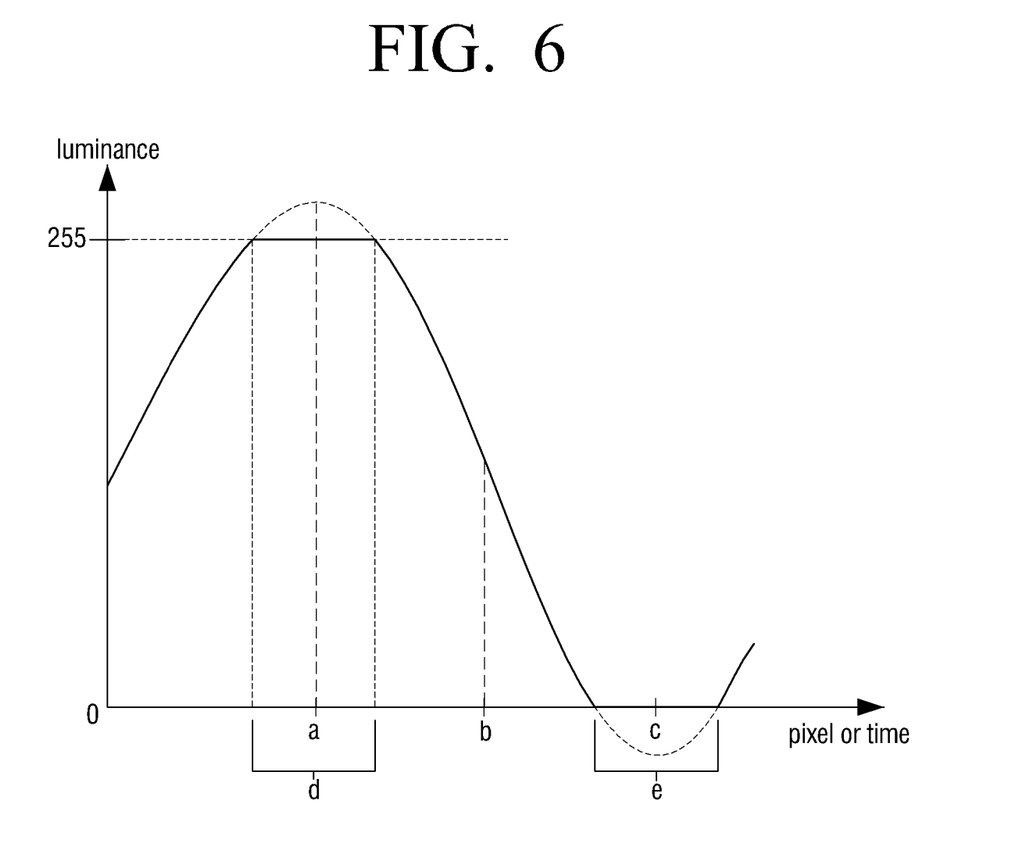
FIG. 6 is a graph illustrating luminance after a gain determined by a gain determination unit is added to luminance received from a luminance detection unit.

FIG. 6 is a graph illustrating luminance after a gain determined by the gain determination unit 220 is added to luminance received from the luminance detection unit 210. That is, FIG. 6 illustrates luminance after each gain shown in FIG. 5 is added to each luminance shown in FIG. 4.

As illustrated in FIG. 6, if a gain determined by the gain determination unit 220 is added to luminance of the image as it is, there may be portions, such as d and e, exceeding the threshold values 0 and 255 of luminance which can be expressed by the display 130. Such portions appear on the display 130 as artifacts.

To solve this problem, the gain adjustment unit 240 adjusts the gain determined by the gain determination unit 220 using the luminance, the amount of change of the luminance, and the threshold values, and adds the adjusted gain to the luminance of the image so as to improve clarity.

In particular, the gain adjustment unit 240 adjusts the gain determined by the gain determination unit 220 so that the luminance to which the adjusted gain is added may be within a preset luminance range which is measured according to the luminance of the image. That is, when the gain adjustment unit 240 adjusts the gain, the gain is not adjusted in the same manner for all the luminance values, but is adjusted so that when luminance to which the adjusted gain is added is added to the image, the luminance may be within a luminance range which is pre-determined according to the original luminance of the image.

For example, it is assumed that luminance of a pixel is 230, which is a value between the maximum point (a) and the inflection point (b), and a gain determined by the gain determination unit 220 is 30. If the gain is simply added to the luminance of the pixel, the luminance becomes 260 and thus exceeds the range of luminance which can be expressed by the display 130. Therefore, the gain adjustment unit 240 should adjust the gain determined by the gain determination unit 220 so that the luminance to which the adjusted gain is added may be within the digital range, that is, between 0 and 255 which can be expressed by the display 130.

The gain adjustment unit 240 adjusts the gain determined by the gain determination unit 220 when luminance to which the gain is added exceeds 255. However, the gain is not adjusted in order for the luminance to which the adjusted gain is added to become 255, but is adjusted in consideration of luminance of the input image.

This is because if the luminance to which the adjusted gain is added becomes 255, a case in which the gain is adjusted and a case in which the gain is not adjusted have no significant difference. That is, although the gain is not adjusted, the range of luminance which can be expressed by the display 130 is between 0 and 255, so even though luminance is determined to be 260, the display 130 displays luminance of 255. Accordingly, it is meaningless that a gain is adjusted and luminance to which the adjusted gain is added becomes 255. As a result, artifacts still may occur.

Therefore, when luminance to which a gain determined by the gain determination unit 220 is added exceeds 255, if luminance of the input image is comparatively high, the gain adjustment unit 240 adjusts the gain so as to make the luminance close to or equal to 255, and if luminance of the input image is comparatively low, the gain adjustment unit 240 adjusts the gain so as to make the luminance far from 255.

Figure 7:
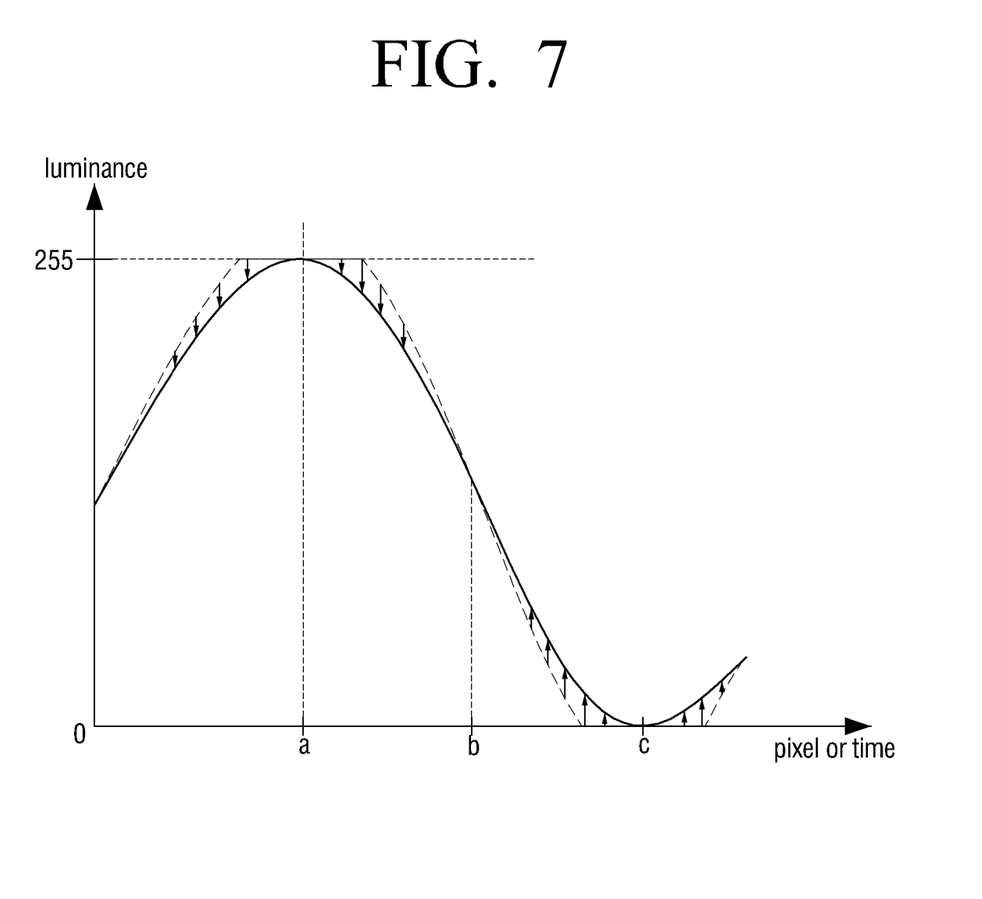
FIG. 7 is a graph illustrating luminance after a gain is adjusted according to luminance of an input image and the adjusted gain is added to luminance.

Luminance to which the adjusted gain is added is shown in FIG. 7. FIG. 7 is a graph illustrating luminance after a gain is adjusted according to luminance of an input image and the adjusted gain is added to the luminance.

As illustrated in FIG. 7, the gain adjustment unit 240 does not uniformly adjust a gain determined by the gain determination unit 220 whenever luminance to which the gain is added exceeds 255. In such a case, if luminance of the input image is comparatively far from 255, the gain adjustment unit 240 adjusts the gain so that luminance may fall within the range of 0 to 255, and is close to or equal to 255, and if luminance of the input image is comparatively close to 255, the gain adjustment unit 240 adjusts the gain so that luminance may fall within the range of 0 to 255, and is far from 255.

Furthermore, the gain adjustment unit 240 does not uniformly adjust a gain determined by the gain determination unit 220 whenever luminance to which the gain is added is lower than 0. In such a case, if luminance of the input image is comparatively far from 0, the gain adjustment unit 240 adjusts the gain so that luminance may fall within the range of 0 to 255, and is close to or equal to 0, and if luminance of the input image is comparatively close to 0, the gain adjustment unit 240 adjusts the gain so that luminance may fall within the range of 0 to 255, and is far from 0.

In addition, the gain adjustment unit 240 adjusts a gain determined by the gain determination unit 220 even when luminance to which the gain is added does not exceed 255, and is not lower than 0. This is for equity with the case in which the luminance to which the gain determined by the gain determination unit 220 is added exceeds 255 or is lower than 0.

That is, if the gain adjustment unit 240 adjusts a gain determined by the gain determination unit 220 only when the luminance to which the gain is added exceeds 255 or is lower than 0, the gain may be similar to a gain of when the luminance to which the gain is added does not exceed 255 and is not lower than 0. As a result, clarity of the image may deteriorate.

Therefore, the gain adjustment unit 240 adjusts the gain determined by the gain determination unit 220 based on the luminance of the input image even when luminance to which the gain is added does not exceed 255, and is not lower than 0.

Consequently, the problem that the luminance exceeds the range of luminance which can be expressed by the display 130 may be prevented, and clarity of the image may be improved. Therefore, the user can view the image having reduced artifacts and improved clarity.

Figure 8:
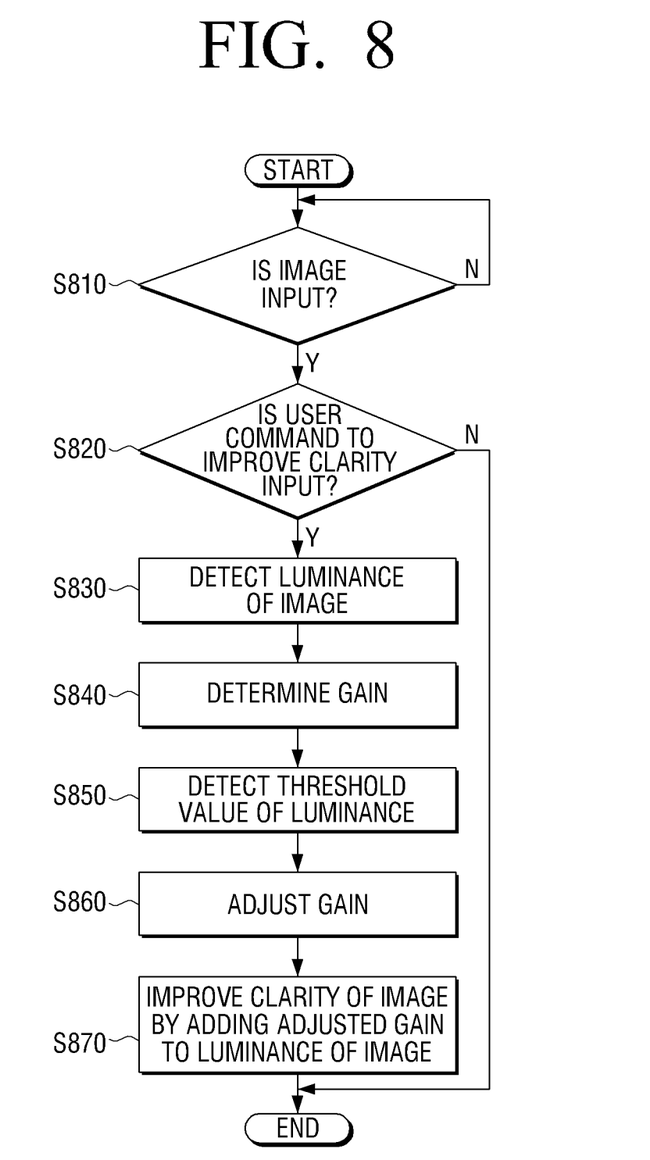
FIG. 8 is a flow chart illustrating a method for processing an image using an image processing apparatus so as to improve the clarity of the image.

FIG. 8 is a flow chart illustrating a method for processing an image using the image processing apparatus 100 so as to improve clarity of the image.

The image processing apparatus 100 determines whether or not an image is externally input (S810). If an image is input (S810-Y), the image processing apparatus 100 determines whether or not a user command to improve clarity is input (S820).

If a user command to improve clarity is input (S820-Y), the image processing apparatus 100 detects luminance of the input image (S830). In particular, the image processing apparatus 100 detects luminance according to change of pixel in the input image or luminance according to change of frame in the input image.

Subsequently, the image processing apparatus 100 determines a gain to be added to the luminance of the input image (S840). In particular, the image processing apparatus 100 determines a gain based on change of luminance according to change of time in which the image is input or based on change of luminance according to change of pixel in which the image is input. More specifically, to increase an amount of change of luminance according to change of time in which the image is input or an amount of change of luminance according to change of pixel in which the image is input, a gain is determined for luminance of each pixel or luminance of each time.

The image processing apparatus 100 detects a digital threshold value of luminance which can be expressed by the display 130 (S850). In particular, the image processing apparatus 100 detects the maximum and minimum threshold value of luminance which can be expressed by the display 130. In the exemplary embodiment of the present invention, the maximum threshold value of luminance is 255 and the minimum threshold value of luminance is 0, but this is merely an example. It may be possible to have different digital threshold values.

Subsequently, the image processing apparatus 100 adjusts the determined gain using the luminance of the input image detected in operation S830, the gain according to luminance determined in operation S840, and the threshold values of luminance detected in operation S850 (S860). In particular, to minimize artifacts which may occur when the luminance of the input image is adjusted only using the determined gain, the image processing apparatus 100 adjusts the determined gain so that the luminance of the input image to which the adjusted gain is added may be within a preset range of luminance measured according to the luminance of the input image based on the threshold values. More specifically, the image processing apparatus 100 does not adjust the gain in the same manner for all the luminance values, but adjusts the gain so that when luminance to which the adjusted gain is added is added to the input image, the luminance may be within a luminance range which is pre-determined according to the original luminance of the input image.

That is, the image processing apparatus 100 does not uniformly adjust the determined gain whenever luminance to which the determined gain is added exceeds 255. In such a case, if luminance of the input image is comparatively far from 255, the image processing apparatus 100 adjusts the gain so that luminance may fall within the range of 0 to 255, and is close to or equal to 255, and if luminance of the input image is comparatively close to 255, the image processing apparatus 100 adjusts the gain so that luminance may fall within the range of 0 to 255, and is far from 255.

Furthermore, the image processing apparatus 100 does not uniformly adjust the determined gain whenever luminance to which the gain is added is lower than 0. In such a case, if luminance of the input image is comparatively far from 0, the image processing apparatus 100 adjusts the gain so that luminance may fall within the range of 0 to 255, and is close to or equal to 0, and if luminance of the input image is comparatively close to 0, the image processing apparatus 100 adjusts the gain so that luminance may fall within the range of 0 to 255, and is far from 0.

In addition, the image processing apparatus 100 adjusts the determined gain even when luminance to which the gain is added does not exceed 255, and is not lower than 0. This is for equity with the case in which the luminance to which the determined gain is added exceeds 255 or is lower than 0.

That is, if the image processing apparatus 100 adjusts the determined gain only when the luminance to which the gain is added exceeds 255 or is lower than 0, the gain may be similar to a gain of when the luminance to which the gain is added does not exceed 255 and is not lower than 0. As a result, clarity of the image may deteriorate.

Therefore, the image processing apparatus 100 adjusts the determined gain based on the luminance of the input image even when luminance to which the gain is added does not exceed 255, and is not lower than 0.

Subsequently, the image processing apparatus 100 adds the adjusted gain to the luminance of the input image so that clarity may be improved (S870).

Consequently, the problem that the luminance exceeds a digital value may be prevented, and clarity of image may be effectively improved. Therefore, the user can view images having reduced artifacts and improved clarity.

The foregoing exemplary embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An image processing apparatus which processes an image to be displayed on a display, the image processing apparatus comprising:
an image receiving unit which receives an image; and
an image processing unit which determines a gain value and a threshold value of sharpness of the image according to an original luminance of the image and adjusts the sharpness of the image by adjusting the gain value so that the luminance of the image is within the threshold value,
wherein the image processing unit comprises:
a gain determination unit which determines the gain value to adjust sharpness of the image based on the original luminance of the image; and
a gain adjustment unit which adjusts the gain value determined by the gain determination unit based on the threshold value and adds the adjusted gain value to the original luminance of the image so that the sharpness of the image may be improved, so that the luminance of the image to which the adjusted gain value is added may be within the preset range of luminance measured according to the original luminance of the image based on the threshold value.

2. The image processing apparatus according to claim 1, wherein the gain adjustment unit adjusts the gain value based on change of the luminance according to change of a time at which the image is input or based on change of the luminance according to change of a pixel to which the image is input.

3. The image processing apparatus according to claim 2, wherein the gain adjustment unit adjusts the gain value for the luminance of each pixel or for the luminance of each time so that an amount of change of the luminance according to change of the time at which the image is input or an amount of change of the luminance according to change of the pixel to which the image is input may be increased.

4. The image processing apparatus according to claim 1, wherein the image processing unit comprises:
a luminance detection unit which detects the original luminance of the image; and
a threshold determination unit which determines the threshold value.

5. The image processing apparatus according to claim 1, wherein the threshold value includes a maximum threshold value and a minimum threshold value of the luminance.

6. The image processing apparatus of claim 1, wherein the threshold value comprises a first luminance threshold value and a second luminance threshold value, and
the gain adjustment unit increases the original luminance values of respective pixels in the image not to exceed the first luminance threshold value, and decreases the original luminance values of respective pixels in the image not to surpass the second luminance threshold value.

7. The image processing apparatus according to claim 1, wherein the gain adjustment unit increases the gain value for some pixels of the image and decreases the gain value for other pixels in the image.

8. A method for processing an image to be displayed on a display, the method comprising:
receiving an image;
determining a gain value and a threshold value of sharpness of the image according to an original luminance of the image; and
adjusting the sharpness of the image by adjusting the gain value so that the luminance of the image is within the threshold value,
wherein the adjusting the sharpness of the image comprises:
determining the gain value to adjust the sharpness of the image based on the original luminance of the image; and
adjusting the determined gain value based on the threshold value, and adding the adjusted gain value to the original luminance of the image,
wherein the determined gain value is adjusted so that the luminance of the image to which the adjusted gain value is added may be within the preset range of luminance measured according to the original luminance of the image.

9. The method according to claim 8, wherein in the determining the gain value, the gain value is determined based on change of the luminance according to change of a time at which the image is input or based on change of the luminance according to change of a pixel to which the image is input.

10. The method according to claim 9, wherein in the determining the gain value, the gain value for the luminance of each pixel or for the luminance of each time is determined so that an amount of change of the luminance according to change of the time at which the image is input or an amount of change of the luminance according to change of the pixel to which the image is input may be increased.

11. A method for processing an image to be displayed on a display, the method comprising:

receiving an image;

determining a gain value and a threshold value of sharpness of the image according to an original luminance of the image;

detecting change of luminance according to change of a pixel or change of a time, from the image; and adjusting the sharpness of the image by adjusting the gain value so that the luminance of the image is within the threshold value, wherein the adjusting the sharpness of the image comprises:

determining the gain value to adjust the sharpness of the image based on the original luminance of the image; and adjusting the determined gain value based on the threshold value, and adding the adjusted gain value to the original luminance of the image, wherein the determined gain value is adjusted so that the luminance of the image to which the adjusted gain value is added may be within the preset range of luminance measured according to the original luminance of the image.

* * * * *